(12) United States Patent
Hines et al.

(10) Patent No.: US 9,528,724 B1
(45) Date of Patent: Dec. 27, 2016

(54) APPARATUS AND METHOD FOR CONFIGURING HELIOSTAT FIELDS

(75) Inventors: Braden Hines, Pasadena, CA (US); Christian T. Gregory, La Crescenta, CA (US)

(73) Assignee: SolarReserve Technology, LLC, Santa Monica, CA (US)

( * ) Notice: Subject to any disclaimer, the term of this patent is extended or adjusted under 35 U.S.C. 154(b) by 946 days.

(21) Appl. No.: 13/491,397

(22) Filed: Jun. 7, 2012

Related U.S. Application Data

(60) Provisional application No. 61/520,355, filed on Jun. 8, 2011, provisional application No. 61/623,495, filed on Apr. 12, 2012.

(51) Int. Cl.
| | | |
|---|---|---|
| *G02B 7/18* | (2006.01) | |
| *F24J 2/36* | (2006.01) | |
| *G02B 5/08* | (2006.01) | |
| *F24J 2/02* | (2006.01) | |

(52) U.S. Cl.
CPC ... *F24J 2/36* (2013.01); *F24J 2/02* (2013.01); *G02B 5/08* (2013.01)

(58) Field of Classification Search
CPC ........... G02B 5/08; H01L 31/0232; F24J 2/02; F24J 2/36
USPC ........ 126/600, 696, 259, 680, 681; 350/292; 136/259
See application file for complete search history.

(56) References Cited

U.S. PATENT DOCUMENTS

| | | | |
|---|---|---|---|
| 4,022,186 A | | 5/1977 | Northrup |
| 4,110,010 A | * | 8/1978 | Hilton ............................ 359/853 |
| 4,184,482 A | | 1/1980 | Cohen |
| 4,187,123 A | | 2/1980 | Diggs |
| 4,223,174 A | | 9/1980 | Moeller |
| 4,227,939 A | * | 10/1980 | Zewail et al. ................ 136/247 |
| 4,256,364 A | | 3/1981 | Minoura et al. |
| 4,280,853 A | | 7/1981 | Palazzetti et al. |
| 4,365,617 A | | 12/1982 | Bugash et al. |
| 4,410,757 A | | 10/1983 | Stamminger et al. |
| 4,459,972 A | | 7/1984 | Moore |

(Continued)

FOREIGN PATENT DOCUMENTS

| | | |
|---|---|---|
| DE | 10150176 | 4/2003 |
| EP | 1895597 | 3/2008 |

(Continued)

OTHER PUBLICATIONS http://wwvv.whitfieldsolar.com/Commercial_ Applications.htm, "Commercial Applications," 1 page.

(Continued)

*Primary Examiner* — Gregory Huson
*Assistant Examiner* — Nikhil Mashruwala
(74) *Attorney, Agent, or Firm* — Kagan Binder, PLLC

(57) ABSTRACT

The present invention relates to apparatus and methods for configuring and arranging heliostats for use in a solar power system. The present invention seeks to improve the overall energy harvesting capacity of a heliostat system while using minimal land area and providing maximum access paths. The present invention teaches that, instead of raising the height of the tower or spacing heliostats according to a rigid schedule, it may be advantageous to vary the height of individual mirrors within a heliostat group, thus mitigating blocking while nonetheless permitting adjacent rows of heliostats to be placed close to one another.

13 Claims, 18 Drawing Sheets

(56) References Cited

U.S. PATENT DOCUMENTS

| | | | |
|---|---|---|---|
| 4,476,854 A | 10/1984 | Baer | |
| 4,572,161 A | 2/1986 | Mori | |
| 4,604,494 A | 8/1986 | Shepard, Jr. | |
| 4,771,764 A | 9/1988 | Cluff | |
| 4,968,355 A | 11/1990 | Johnson | |
| 4,995,377 A | 2/1991 | Eiden | |
| 5,979,438 A * | 11/1999 | Nakamura | F24J 2/07 126/578 |
| 6,020,554 A | 2/2000 | Kaminar et al. | |
| 6,058,930 A | 5/2000 | Shingleton | |
| 6,079,408 A | 6/2000 | Fukuda | |
| 6,848,442 B2 | 2/2005 | Haber | |
| 6,959,993 B2 | 11/2005 | Gross et al. | |
| 6,971,756 B2 | 12/2005 | Vasylyev et al. | |
| 6,984,050 B2 * | 1/2006 | Nakamura | F24J 2/07 353/3 |
| 7,156,088 B2 | 1/2007 | Luconi | |
| 7,192,146 B2 | 3/2007 | Gross et al. | |
| 7,388,146 B2 | 6/2008 | Fraas et al. | |
| 7,442,871 B2 | 10/2008 | Meyers | |
| 7,622,666 B2 | 11/2009 | Hines | |
| 7,906,750 B2 | 3/2011 | Hickerson et al. | |
| 7,994,459 B2 | 8/2011 | Zavodny et al. | |
| 8,104,893 B2 | 1/2012 | Reznik et al. | |
| 8,136,783 B2 * | 3/2012 | Pietrzak | 248/370 |
| 8,153,945 B2 | 4/2012 | Hickerson et al. | |
| 8,192,027 B2 | 6/2012 | Reznik et al. | |
| 8,242,350 B2 | 8/2012 | Cashion et al. | |
| 8,449,692 B2 | 5/2013 | Blair et al. | |
| 8,590,527 B2 | 11/2013 | Luconi et al. | |
| 8,613,278 B2 | 12/2013 | Arbogast et al. | |
| 8,640,689 B1 | 2/2014 | Kribus et al. | |
| 8,656,907 B2 | 2/2014 | Pham et al. | |
| 8,697,983 B2 | 4/2014 | Cashion et al. | |
| 8,726,458 B1 | 5/2014 | Mahr et al. | |
| 8,763,397 B1 | 7/2014 | Meduri et al. | |
| 8,789,523 B1 | 7/2014 | Kribus et al. | |
| 2003/0000564 A1 | 1/2003 | Shingleton | |
| 2004/0004175 A1* | 1/2004 | Nakamura | F24K 2/07 250/203.4 |
| 2005/0229924 A1 | 10/2005 | Luconi et al. | |
| 2006/0060188 A1 | 3/2006 | Hickerson | |
| 2007/0070531 A1 | 3/2007 | Lu | |
| 2007/0188876 A1 | 8/2007 | Hines et al. | |
| 2007/0193620 A1 | 8/2007 | Hines et al. | |
| 2007/0272234 A1* | 11/2007 | Allen | F24J 2/16 126/704 |
| 2008/0023061 A1 | 1/2008 | Clemens et al. | |
| 2008/0128586 A1 | 6/2008 | Johnson et al. | |
| 2009/0000612 A1 | 1/2009 | Hines et al. | |
| 2009/0007901 A1* | 1/2009 | Luconi et al. | 126/627 |
| 2009/0056698 A1 | 3/2009 | Johnson et al. | |
| 2009/0056785 A1 | 3/2009 | Johnson et al. | |
| 2009/0056786 A1 | 3/2009 | Johnson et al. | |
| 2009/0056787 A1 | 3/2009 | Johnson et al. | |
| 2009/0283134 A1 | 11/2009 | Hines | |
| 2010/0032004 A1 | 2/2010 | Baker et al. | |
| 2010/0258187 A1* | 10/2010 | Mori et al. | 136/259 |
| 2011/0259320 A1* | 10/2011 | Yuasa et al. | 126/601 |
| 2014/0158114 A1* | 6/2014 | Ishida et al. | 126/688 |
| 2016/0084529 A1* | 3/2016 | Xiang | F24J 2/542 126/600 |

FOREIGN PATENT DOCUMENTS

| | | |
|---|---|---|
| WO | 2005/119133 | 12/2005 |
| WO | 2007/041018 | 4/2007 |
| WO | 2007/093422 | 8/2007 |

OTHER PUBLICATIONS http://sol3g.com/eng/Gira-sol%20System%20v8.pdf, "The Gira-Sol System," 7 pages.

http://www.whitfieldsolar.com/Technical_Specifications.htm, "Technical Specifications," 1 page.

http://www.conergy.de/en/Desktopdefult.aspx/tabid-1765/1806_read-8784/, Conergy Europe—Renewable Energy—Conergy SolarOptimus, Tracking Systems, 3 pages.

Kurtz and Friedman, "Photovoltaics-Lighting the Way to a Brighter Future," Optics & Photons News, pp. 30-35, Jun. 2005.

Cho et al., "Optimization of the ATST Primary Mirror Support System," Proc. SPIE 6273, Optomechanical Technologies for Astronomy, 2006, 12 pages.

http://www.energyinnovations.com/sunpod.html, 1 page.

http://whitfieldsolar.com/ "Home Page," 1 page.

http://whitfieldsolar.com/Products, Overview, 2 pages.

http://whitfieldsolar.com/products/products_sub.php, Products, Concentrating Photovoltaic, 1 page.

http://whitfieldsolar.com/Product.htm, "Product Features," 1 page.

http://www.energyinnovations.com/technology/, illustrating light is concentrated 800x onto highly efficient PV cells, 2 pages.

http://www.energyinnovations.com/technology/, illustrating altitude tilt tracking, 2 pages.

http://www.energyinnovations.com/technology/, illustrating "azimuth rotational tracking," 2 pages.

http://energyinnovations.com/technology/, illustrating "low profile design," 2 pages.

http://energyinnovations.com/technology/, illustrating "self powered design" (design #1), 2 pages.

http://energyinnovations.com/technology/, illustrating "self powered design" (design #2), 2 pages.

http://energyinnovations.com/products/, Sunflower, Is It Right for You?, 2 pages.

http://sol3g.com/eng/girasol.htm, "The Gira-Sol Project," 2 pages.

Solar Optimus—TD-Eng-0801, 4 pgs.

Swanson, "The Promise of Concentrators", Progress In Photovoltaics: Research and Applications, Prog. Phtotvolt. Res. Appl. 8, 91-111 (2000).

Richman et al., "Investigation of High-Concentration Pholovoltaic Cell Packages After Three Years Field Service," 8289 Solar Energy materials and Solar Cells 30 (1993) August, No. 3, Amsterdam, NL.

Sandia Commercial Applications, 4 pages.

* cited by examiner

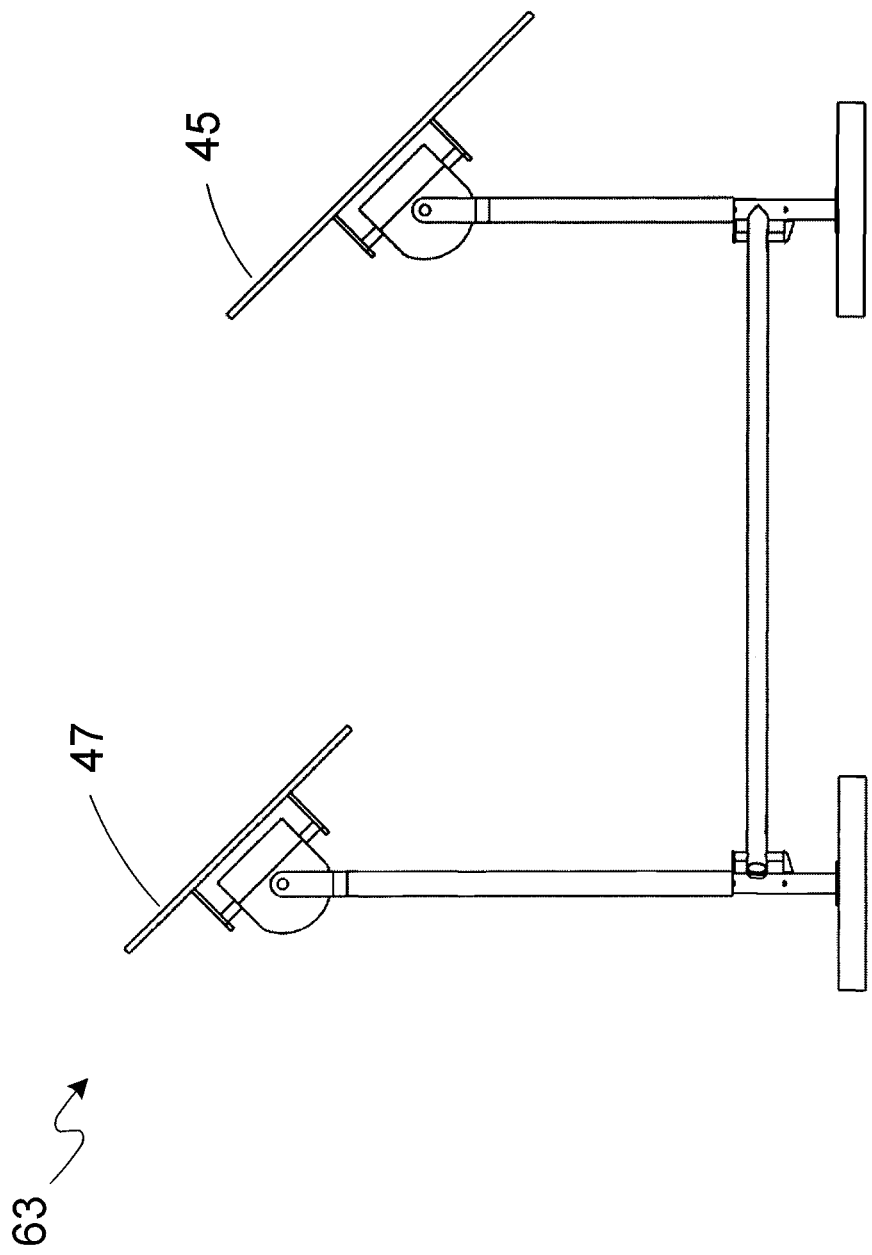

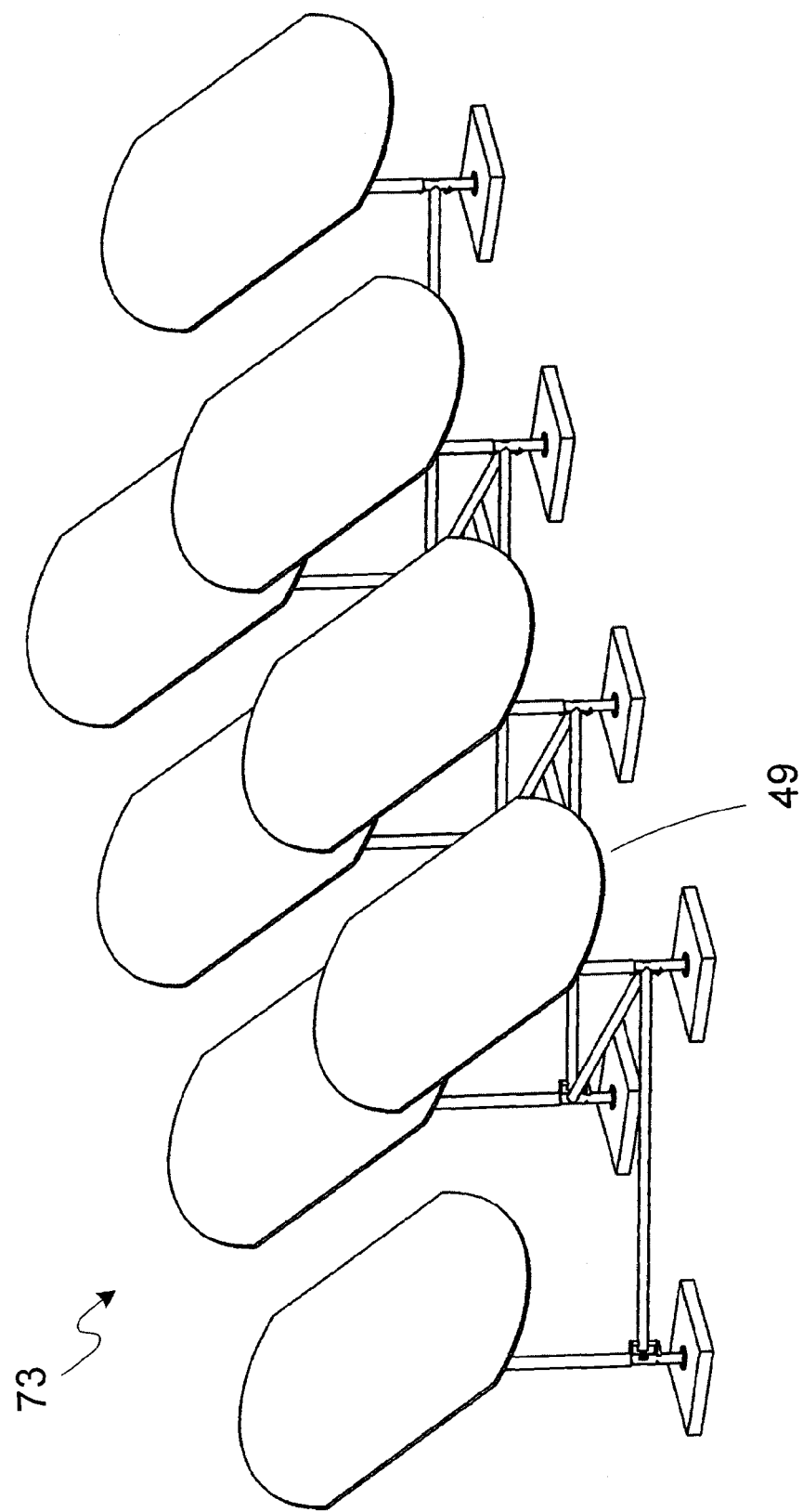

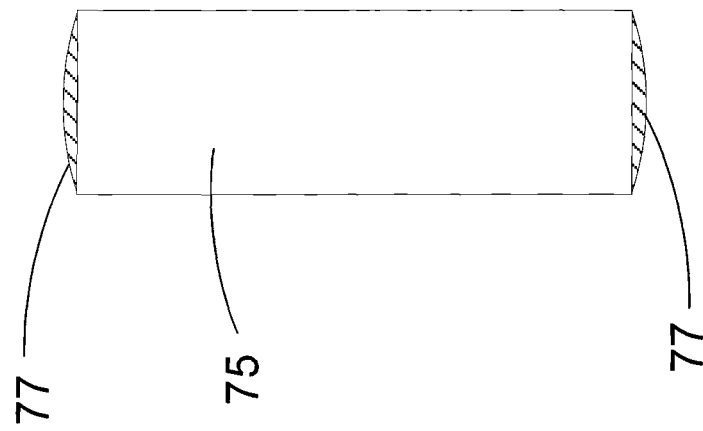

APPARATUS AND METHOD FOR CONFIGURING HELIOSTAT FIELDS

CROSS REFERENCE TO RELATED APPLICATIONS

This application claims the benefit of U.S. Provisional application No. 61/520,355 filed Jun. 8, 2011, titled Apparatus and Method for Configuring Heliostat Fields, and U.S. Provisional application No. 61/623,495, filed Apr. 12, 2012, titled Heliostat Pod for Concentrated Solar Power, each of which is incorporated herein by reference in its respective entirety for all purposes.

FIELD OF THE INVENTION

The present invention relates generally to the field of concentrating solar power and in particular to apparatus and methods to configure heliostats for the purpose of redirecting incident solar radiation onto a central target. Of specific interest is the configuration of heliostats on industrial rooftop or similar area-constrained applications in which to deploy a heliostat field efficiently.

BACKGROUND OF THE INVENTION

The use of heliostats in the field of concentrating solar power (CSP) is well established in the prior art. A typical CSP system includes at least one centralized tower and a plurality of heliostats corresponding to each centralized tower. The tower is centralized in the sense that the tower serves as the focal point onto which a corresponding plurality of heliostats collectively redirect and concentrate sunlight onto a target (also referred to as a focus or a receiver) associated with the tower. The concentration of sunlight at the target is therefore directly related to the number of heliostats associated with the target up to certain fundamental limits. This approach concentrates solar energy to very high levels, e.g., on the order of 1000× or more if desired. In practical application, many systems concentrate sunlight in a range from 50× to 5000×. The high concentration of solar energy is converted by the target into other useful forms of energy. One mode of practice converts the concentrated solar energy into heat to be used either directly or indirectly, such as by generating steam, to power electrical generators, industrial equipment, or the like.

In other modes of practice, the concentrated solar energy is converted directly into electricity through the use of any number of photovoltaic devices, also referred to as solar cells.

Heliostat field configurations can take various forms depending on the design of the target receiver and on the geometry constraints of the installation area. A common geometry arranges heliostats in concentric arcs with the target at the center of the effectual circle. In general, the target is located at a latitude that is closer to the equator relative to the heliostat field so as to improve the overall efficiency of the heliostat over the course of the year. It is noted that in some configurations it is possible for heliostats to completely encircle the target. Other possible configurations include various kinds of rectilinear grids of heliostats where there are definable rows and columns. Furthermore the number of heliostats may be the same in each arc/row or may vary.

In all practical cases of heliostat configurations there is a need to provide some quantity of spacing between individual and or groups of heliostats. Such spacing is at minimum required to ensure that heliostats can articulate in such a manner as to not collide with adjacent heliostats. In addition, there is a need to provide service access for routine maintenance such as cleaning, repair and replacement of failed components. Furthermore space between concentric arcs or rows of heliostats is advantageous in order to reduce the blocking caused by heliostats closer to the target. The amount of possible blocking for a given arc/row separation and mirror size increases with distance from the target. Conversely, to maintain a constant nominal optical area efficiency of a given heliostat, the spacing between arcs/rows must necessarily increase as a function of distance from the target.

In the case of ground mounted heliostat fields, there is generally sufficient area in which to optimize the configuration of the heliostats to meet the aforementioned spacing requirements. The application of heliostat fields to industrial rooftops for the purpose of generating industrial steam introduces additional configuration constraints. These are defined by the available rooftop geometry and a potentially increased need for access paths throughout the field in order to comply with various fire regulations and provide service access to other rooftop entities such as HVAC systems and the like.

SUMMARY OF THE INVENTION

The present invention relates to apparatus and methods to configure heliostat fields that alone or in combination address limitations of heliostat configurations that exist in the prior art. In particular the present invention seeks to improve the overall energy harvesting capacity of a heliostat system while using minimal land area and providing maximum access paths.

For clarity, in these descriptions, we will define a row of heliostat to be either heliostats having approximately the same radial distance to the Target in the case of concentric arc configurations or those having approximately the same projected distance from the target in the case of a rectilinear configuration. However, one skilled in the art will appreciate that the concepts described here apply to any convenient configuration of heliostats, including arrangements where heliostats are grouped together at varying distances, such as in a zig-zag pattern.

The present invention teaches that heliostats can be configured at various distinct vertical displacements. Given a row of heliostats with mirrors at a first vertical displacement and having an overall first optical area efficiency, the required separation between this first row and a second row to maintain the same optical area efficiency in the second row of heliostats can be reduced by increasing the vertical displacement of the second row of heliostat mirrors relative to the vertical displacement of the first row of mirrors.

The present invention teaches that heliostats can be configured such that the vertical displacement of heliostat mirrors can be increased as a function of distance from the target in order to help maintain a constant separation between rows of heliostats while helping the overall optical efficiency of the heliostats to remain constant.

The present invention also teaches that heliostats can be configured such that the vertical displacement of the heliostat mirrors have a substantially periodic variation by which the vertical displacement increases as a function of distance from the target, starting at a first, lowest height for the heliostat mirror most proximal to the target, increasing in one or more steps up to a second maximum height for a heliostat mirror further from the target. The invention teaches that, upon reaching this second height, the vertical displacement of the next heliostat row may be reset to the same height as the proximal heliostat mirror in the previous interval. The horizontal displacement for this new row can be increased to compensate for the vertical displacement difference between it and the previous row. Advantageously this configuration provides for wider access space between such rows while enabling higher heliostat density elsewhere in the heliostat field.

The present invention furthermore teaches that vertical displacement of heliostat mirrors may be effected by providing various precut lengths of support poles on which heliostat mechanisms are mounted. These support poles advantageously mate to common support structure that serves to orient and group heliostats in well defined groups.

The present invention also teaches that vertical displacement of heliostat mirrors may be effected by providing a support structure that inherently incorporates the vertical displacements.

In another embodiment, the present invention teaches that relative vertical displacement of heliostat mirrors may be accomplished by installing a heliostat group such that it is tilted towards the central target, helping to provide different vertical mirror displacements even when the group itself is constructed with uniform support pole lengths, for example.

The present invention appreciates that mirrors at greater heights will tend to be exposed to higher wind forces than those with lower heights. In some embodiments, the present invention provides smaller mirrors for use at the greater heights, helping to reduce the wind force on these more exposed mirrors.

Applicants' co-pending U.S. patent application Ser. No. 13/418,947 teaches heliostat groups that implement a tip-tilt tracking architecture. The present invention further teaches that a particularly useful mirror shape for a tip-tilt tracking heliostat is a rounded rectangle shape, helping to provide more heliostat mirror area per land area than conventional rectangular mirrors.

BRIEF DESCRIPTION OF THE DRAWINGS

FIG. 10A is profile view of a heliostat group with elevated mirrors that are smaller.

FIG. 11 is a perspective view of a heliostat group using rounded rectangle mirrors.

FIG. 14 is a diagram of a representative mirror with a three-to-one aspect ratio.

DESCRIPTION OF THE INVENTION

The apparatus and methods presented herein describe a heliostat field configuration that advantageously provides an efficiently dense arrangement of heliostats with sufficient service access space required for applications of area-constrained heliostat fields such as those deployed on industrial rooftops.

Figure 1:
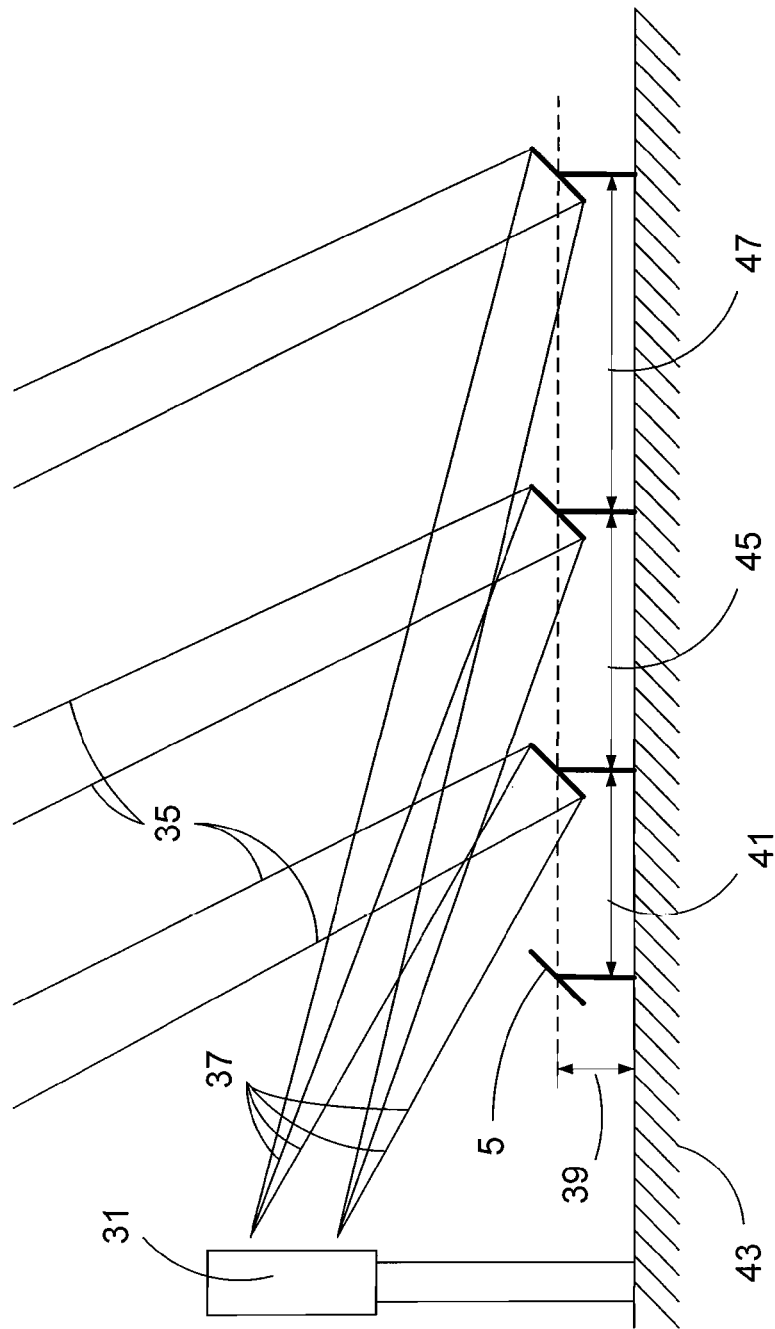
FIG. 1 is a profile view of an exemplary heliostat field.

FIG. 1 illustrates an exemplary prior art heliostat field in profile including a central target 31 and a plurality of heliostats 5 mounted on a substantially planar and fixed surface 43 and whose mirrors have a generally common vertical displacement 39 relative to this fixed surface 43. Incident solar radiation 35 is redirected by heliostats 5 so that the reflected rays 37 impinge on the central target 31. As illustrated, heliostats rows are separated by a horizontal distance that generally increases as a function of distance from the target so as to minimize the blocking of the more distant heliostats by the nearer ones with distance 45 being greater than distance 41, and distance 47 being greater than distance 45. This additional spacing increases the energy harvest per heliostat; however, it decreases the total possible energy harvest per unit of land area. There exists then a design trade between the cost per heliostat and the total energy a system can deliver to the target over the course of a solar year.

A common prior art method to mitigate the spacing requirement in heliostats is to increase the height of the tower supporting the target, but this may not be as preferable in many instances. Tower height may be constrained by cost, or by regulations. By way of example, in the case of a heliostat system intended for industrial rooftop deployments, the tower may often be located near or attached to a building and it may be impractical to exceed a height substantially greater than 30 feet above the heliostat field.

Figure 2:
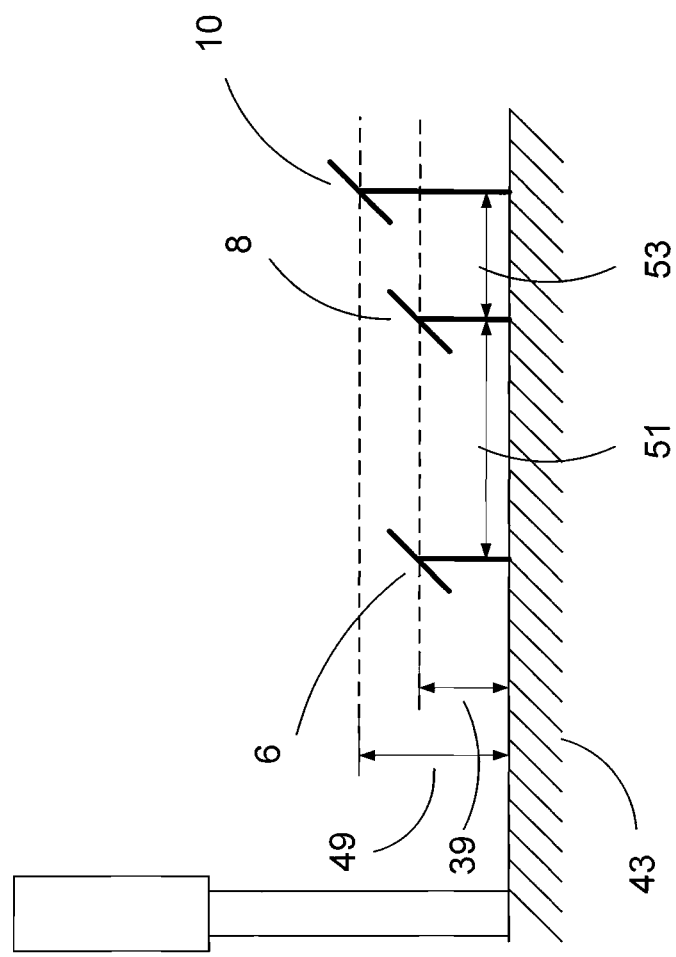
FIG. 2 is a profile view of an exemplary heliostat field with vertically displaced heliostats.

The present invention teaches that, instead of raising the height of the target or spacing heliostats according to a rigid schedule, it may be advantageous to vary the height of individual mirrors. Referring to FIG. 2, a group of heliostats are shown having a configuration such that the heliostat mirror 10 farther from the target has a vertical displacement 49 relative to the mounting surface 43 that is greater than the vertical displacement 39 of heliostat mirrors 6 and 8. Consequently, the lateral spacing 53 may be less than spacing 51 without introducing undesirable blocking of mirror 10 by mirror 8.

Figure 3:
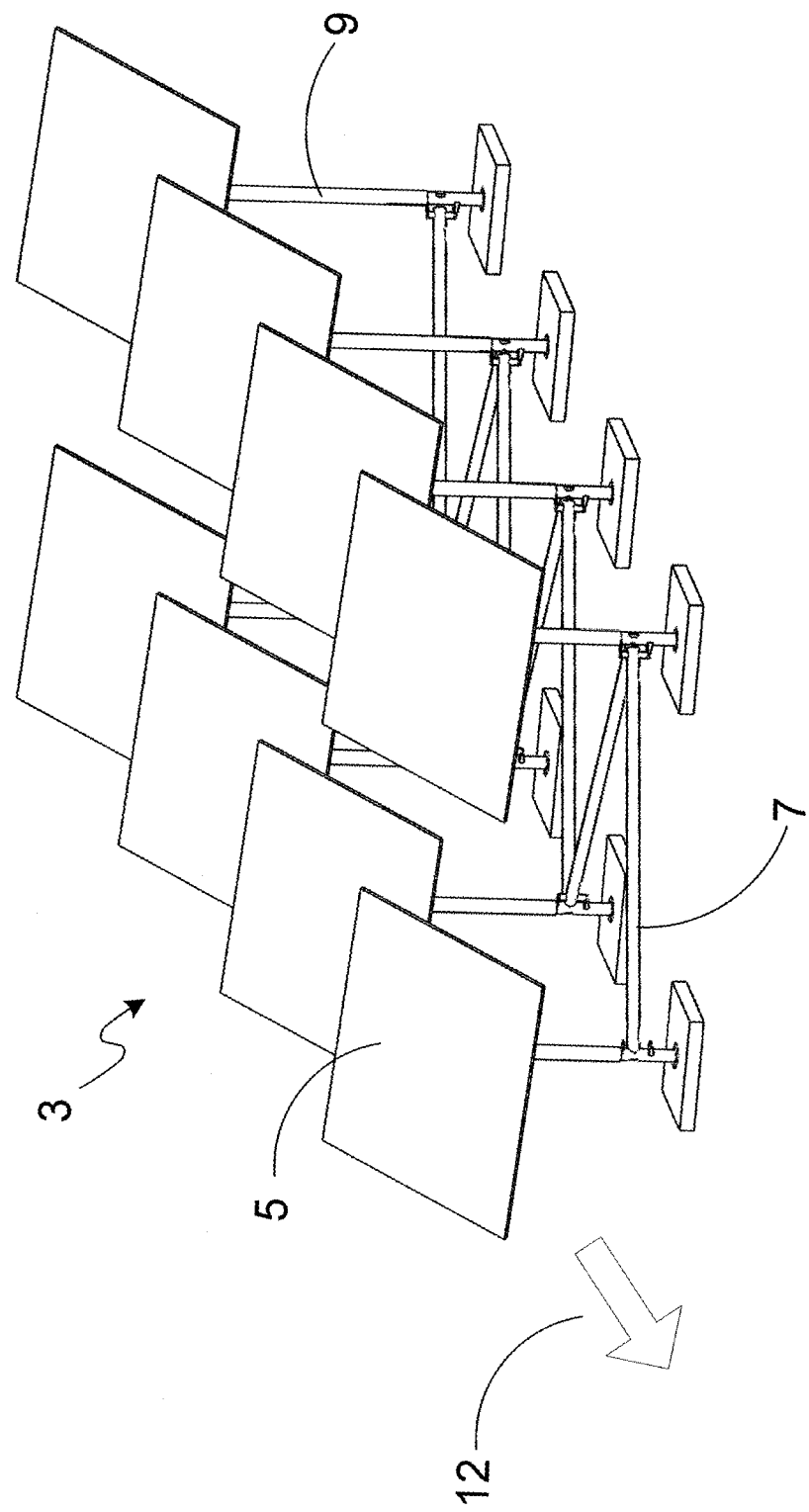
FIG. 3 is a perspective view of an exemplary heliostat group.

Referring to FIG. 3, a plurality of heliostats 5 are arranged into a mechanically coupled heliostat group 3 including a support frame 7 including mounting poles 9 having a plurality of associated lengths. Each heliostat 5 is mechanically coupled to mounting pole 9 in such a way that the vertical displacement of the heliostat mirrors is affected by the length of mounting pole 9. In preferred embodiments, the height increases with distance from the target, with the direction to the target being indicated by arrow 12. In many embodiments, the height increases according to some defined function, such as linearly with distance.

Figure 4:
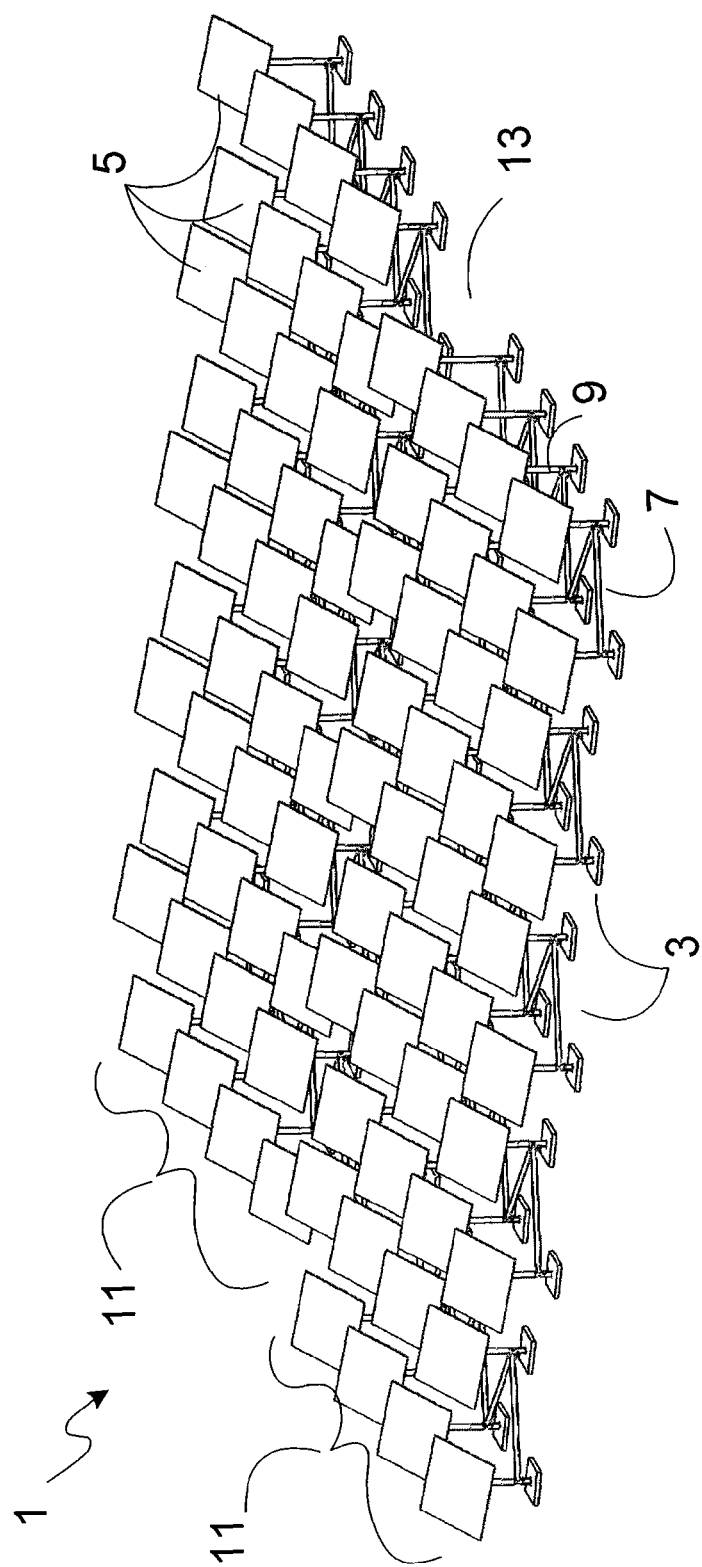
FIG. 4 is a perspective view of an exemplary tiered heliostat configuration.

Referring to FIG. 4 heliostat field 1 includes a plurality of heliostat groups 3 each including a plurality of heliostats 5 mechanically coupled to a support frame 7 including mounting poles 9. The plurality of heliostat groups are arranged into rows 11 separated by aisle 13. The vertical displacement of the mirrors of heliostats 5 is a function of each heliostat's relative position in the heliostat group 3 and is defined by the length of mounting poles 9. In one embodiment mounting pole 9 has a specific length for each position in support frame 7. In a typical embodiment, with mirrors that are between 0.25 square meters and 3 square meters in area, poles 9 may vary from a short length such as 0.2 meters or even shorter to a long length as great as 4 meters or even greater. While the mirrors are shown in the figure as single pieces of flat glass, they may comprise multiple individual facets or may be curved.

Figure 5:
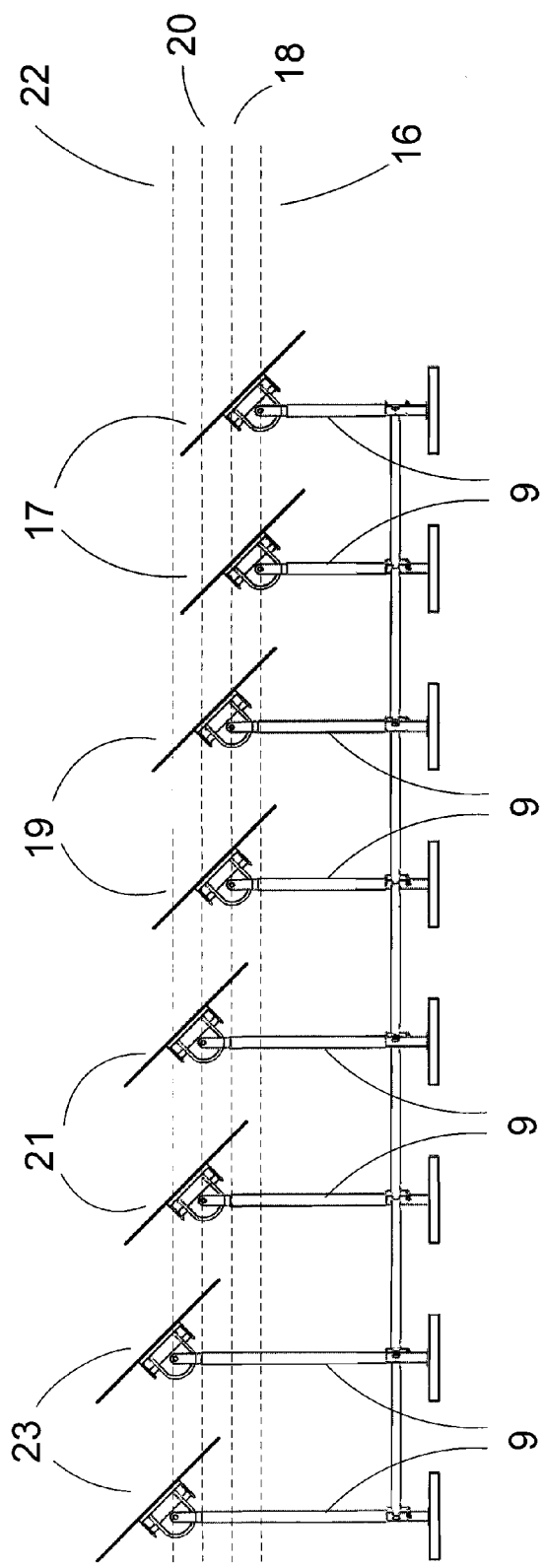
FIG. 5 is a profile view of an exemplary tiered heliostat configuration.

In an alternative embodiment shown in FIG. 5 heliostat positions are paired such that the most proximal two positions have mounting poles 9 having the same length, helping to provide the same first mirror height 16, the next most proximal pair sharing a common second length to help provide a second mirror height 18, and so on and so forth for each subsequent adjacent pair or positions.

Figure 6:
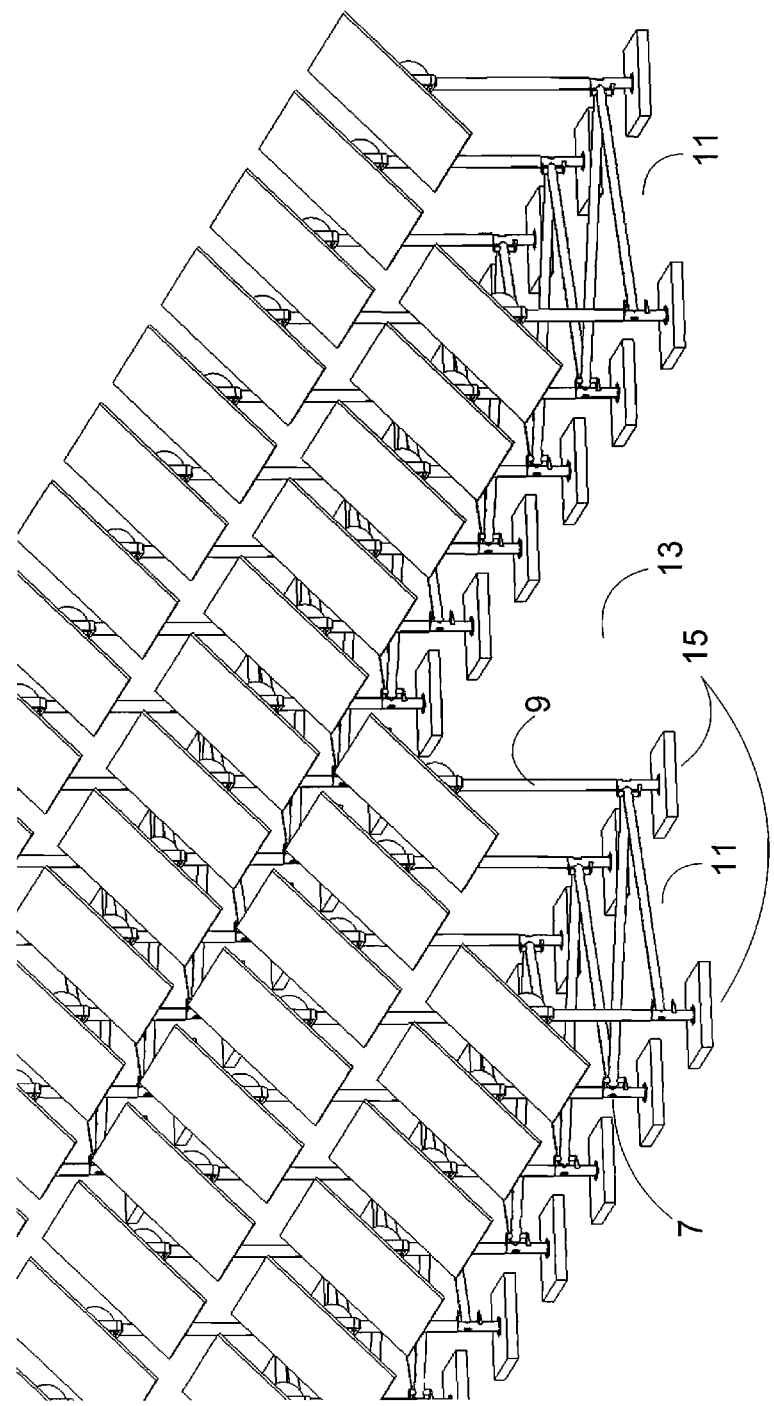
FIG. 6 is a perspective view of an alternative exemplary tiered heliostat configuration.
Figure 8:
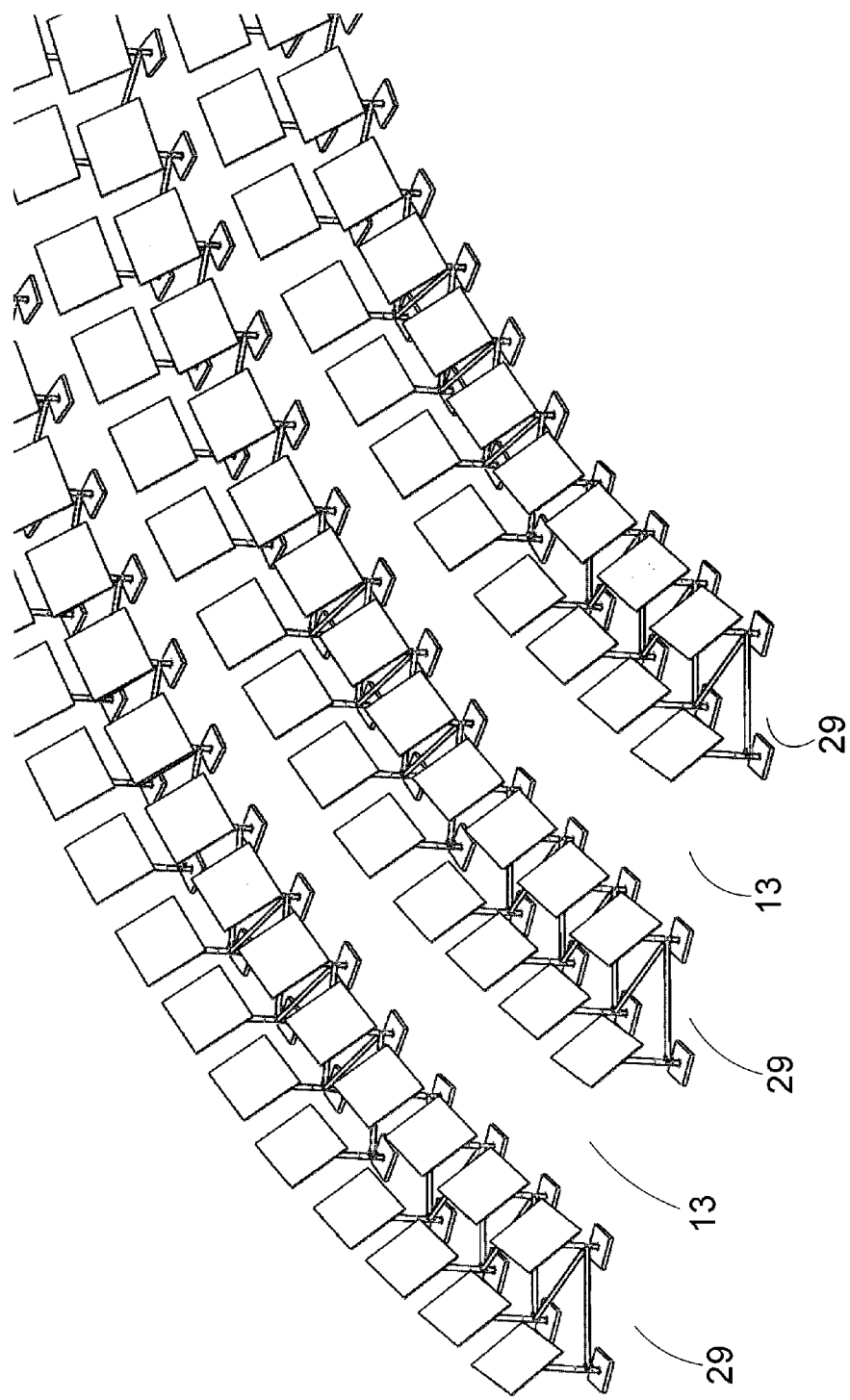
FIG. 8 is a perspective view of an alternative exemplary tiered heliostat configuration.

The plurality of mounting pole lengths define a plurality of distinct heliostat tiers, each tier of mirrors having substantially equal vertical mirror displacement relative to the mounting surface. In some preferred embodiments, the same tiers of adjacent heliostat groups are arranged at substantially the same distance from the target, such that the heliostat grouping form arcs, as illustrated in FIG. 8, while in other preferred embodiments, the same tiers are arranged in rows on a grid pattern, as shown in FIGS. 4 and 6. However, the groups may be deployed in any convenient arrangement, and the present invention does not require that the tiers of one group be aligned with the tiers of a neighboring group; in fact, in some embodiments, the group-to-group tiering may be intentionally staggered, for example to help provide a desired shadowing pattern over the course of a day. By way of example, tiers in one group might be offset by half the nominal mirror spacing from tiers in the next group; however, any convenient offset may be used.

The plurality of tiers advantageously enable heliostats 5 with a heliostat group row 11 to be arranged in a relatively close proximity without undue blocking of distal heliostats within a group by more proximal heliostats within the same group. Furthermore, a consequence of the tiers is to increase the desired separation between heliostat group rows 11 which is advantageous for service access throughout the heliostat field 1 for such purposes as maintenance, and meeting safety requirements. In essence the heliostat tiers help to provide a mechanism by which the spacing of the heliostat field can be compressed in some areas and expanded in others, without affecting overall optical area efficiency, helping to expand service access aisles 13 without sacrificing too much field area.

Within a heliostat group, there may be one or more sub-groupings of heliostats with generally increasing mirror heights, which we will refer to as columns of heliostats; columns tend to be substantially orthogonal to tiers. A column is oriented so that is pointed generally towards the target (but is not required to point directly at it, perhaps pointing as much as 30 degrees, or even 45 degrees, away from the target). The front of the column is the end with lower mirror heights, while the rear of the column is the end with higher mirror heights. Referring to FIG. 3, in one contemplated embodiment each heliostat group 3 includes a plurality of heliostats 5 configured as two columns that are staggered substantially laterally (with respect to the target direction 12) with respect to one another; that is, the fronts of the columns within the group are located at varying distances from the target, and from heliostat group to heliostat group, this distance variation tends to repeat. Heliostats 5 have mirrors that are vertically displaced by mounting poles 9 (included in frame 7) into eight distinct tiers, with tiers more proximal to the target preferably having lower mirror heights. In the figure, the proximal mirrors in each of the two columns have the same height, but they may also be of different heights. Referring to FIG. 4, a plurality of heliostat groups 3 are further grouped into a plurality of rows 11 separated by a plurality of aisles 13.

Referring to FIG. 5, in yet another alternative embodiment heliostats 5 have mirrors that are vertically displaced by mounting poles 9 into four distinct tiers 17, 19, 21, and 23 at heights 16, 18, 20, and 22 respectively. In other contemplated embodiments heliostats are arranged in any number of distinct tiers.

By way of example, height 16 might be as short as half the mirror height, perhaps as short as 0.1 meters, or as high as 3 meters, and the heights may increase distally by only a small amount, even as small as 1-2 cm, or by a large amount, such as an entire mirror height, or even more, perhaps as much as 1 meter or even 2 meters or even more per step. One skilled in the art will appreciate that is desirable for cost reasons to keep heights as low as possible, while it is desirable on the other hand to provide a first height 16 that is high enough to provide for clearance over vegetation or other obstacles, and to provide distal height increases that are large enough to provide for minimal blocking.

Referring to FIG. 6 in another alternative embodiment heliostat groups 3 are oriented such that the support frame 7 arranges heliostats into a plurality of rows that are staggered relative to one another. In such an embodiment each row within the group defines a distinct heliostat tier. The vertical displacement of the tier is determined by the length of mounting pole 9 which are substantially the same length within a given row 15.

Figure 7:
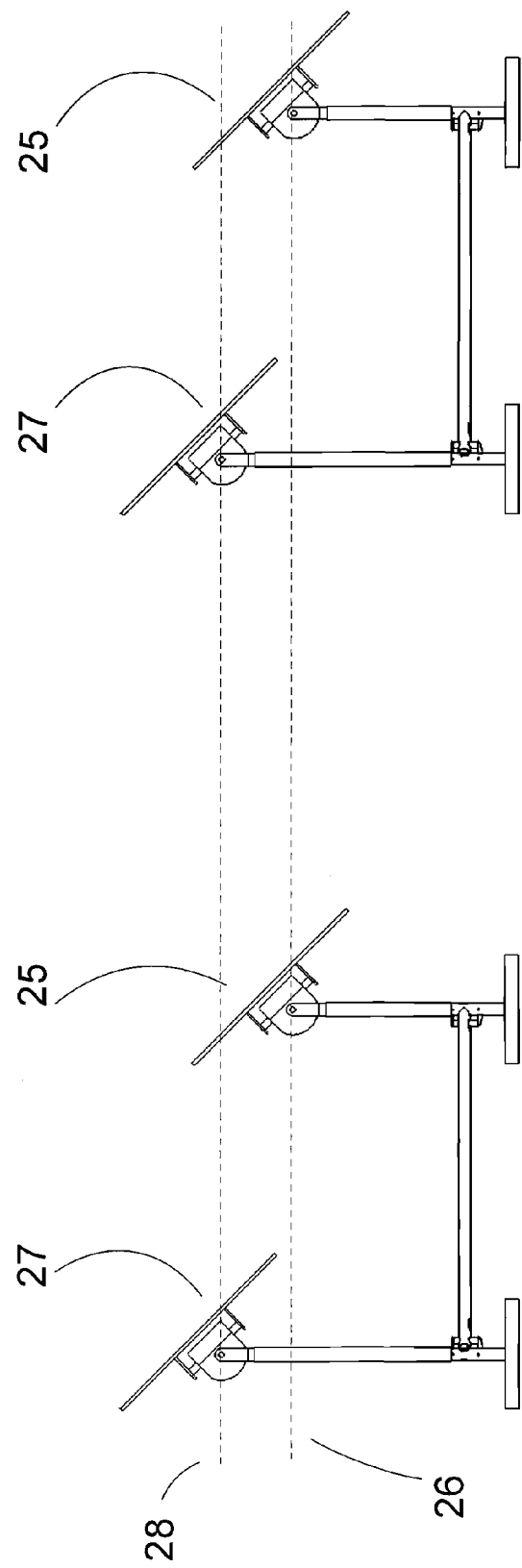
FIG. 7 is a profile view of an alternative exemplary tiered heliostat configuration, showing two heliostat groups.

In one exemplary embodiment, heliostat support structure 7 includes two rows which, together with a plurality of similar structures, form a heliostat group row 11. An exemplary configuration for a field of heliostats according to this embodiment includes a plurality of heliostat group rows 11 and a plurality of aisles 13. Referring to FIG. 7, two distinct tiers 25 and 27 are formed, with tier 25 being at a first height 26 and tier 27 being at a second height 28. Mirrors within the same tier are preferably at the same height.

In aforementioned embodiments, heliostat groups 3 have been arranged in a substantially rectilinear pattern. In an alternative arrangement heliostat groups 3 may be arranged in a substantially radial pattern. Referring to FIG. 8 heliostat groups 3 are arranged into a plurality of substantially concentric arcs 29 separated by aisles 13. In this particular embodiment each concentric arc 29 includes two distinct heliostat tiers. In alternative embodiments concentric arcs 29 include more than two heliostat tiers.

These exemplary embodiments illustrate numerous instances of a preferred general pattern of heliostat groupings and tier heights and arrangements. In preferred embodiments, heliostats are grouped into sub-groups such that heliostats more proximal to the target have mirror heights that are lowest, starting at a first height. Moving from front to rear within a column of mirrors within a heliostat group 3, mirror height is increased according to a preferred pattern, depending on the requirements of the particular concentrating solar power system. It is usually preferred to increase height with each distal step, but some embodiments may provide two or more mirrors at the same height within a column before increasing mirror height. So, after the first set of one or more mirrors in each column at a first height, a second set of one or more mirrors in each column may be provided at a second height, and so on, to a final height for the most distal mirrors in each column. As illustrated in FIG. 5, which is a side view of the heliostat group shown in FIG. 3, the mirrors within adjacent columns may be at the same heights, but the heights of each column's mirrors may also be independent of each other. In many preferred embodiments, height simply increases linearly with each distal step.

For groupings with more than two tiers, while the figures have illustrated heliostat groups with substantially similar spacing between tiers, the present invention also contemplates variable spacing between tiers, especially spacing that increases with distance from the target.

Preferred embodiments of heliostat fields using preferred heliostat groupings then introduce aisles between the groupings, with aisle widths generally increasing with distance from the target, helping to minimize blocking.

One skilled in the art will appreciate that for small fields, it may be convenient to use only one type of heliostat grouping, with one set of mirror heights and tier spacings, while for larger fields, it may be desirable to provide multiple types of heliostat groupings. By way of example, in some preferred embodiments, groupings closer to the target might use closer-packed tiers with smaller variations in mirror height, while groupings farther from the target might use more widely spaced tiers and/or larger variations in mirror heights.

Figure 9A:
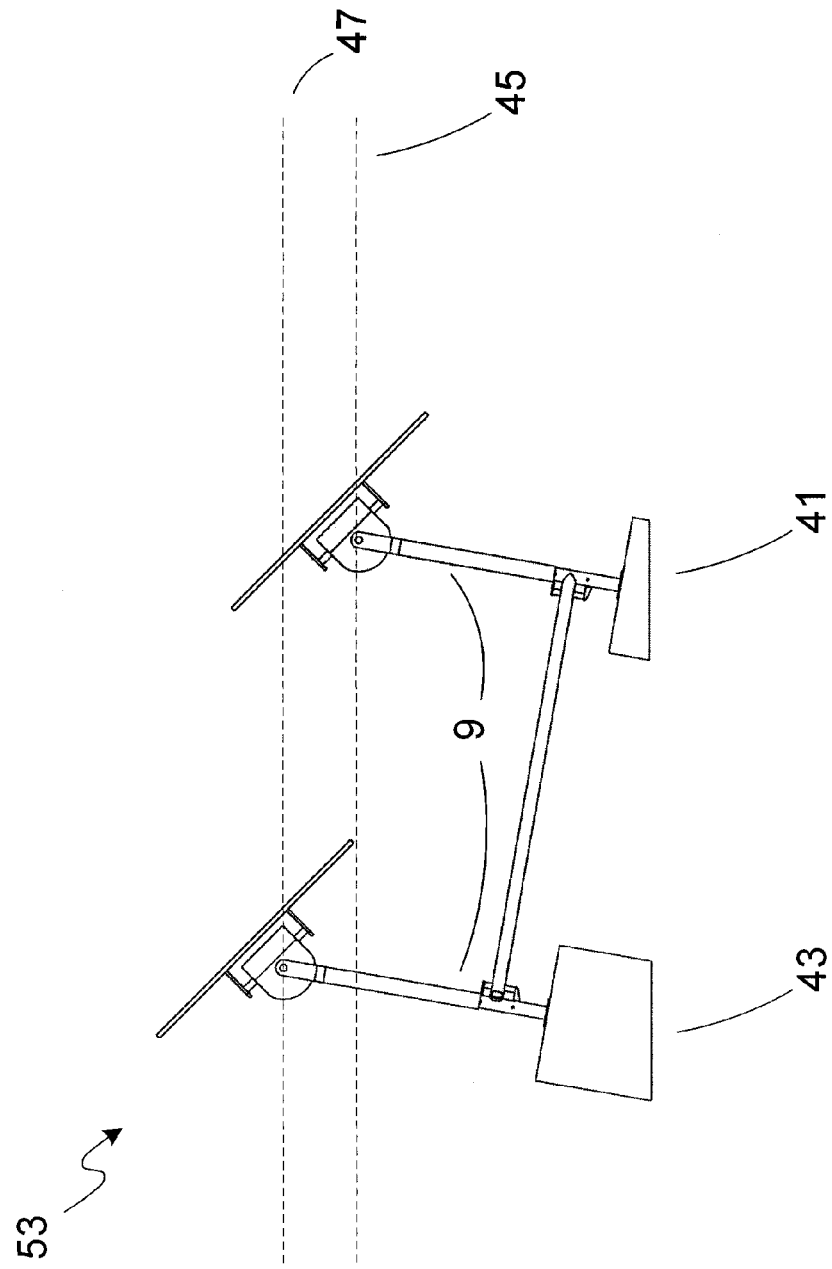
FIG. 9A is a profile view of a canted heliostat group.
Figure 9B:
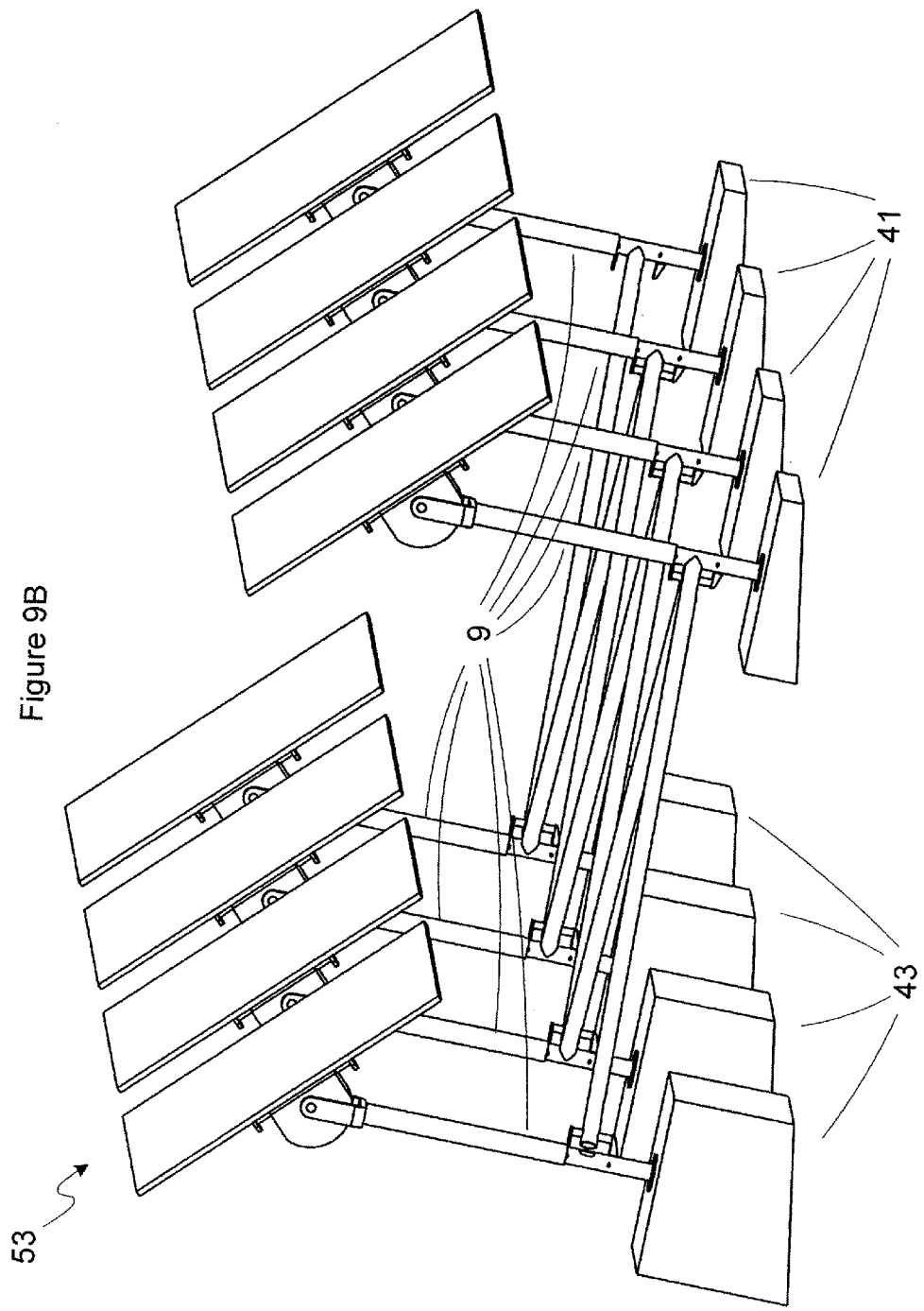
FIG. 9B is a perspective view of a canted heliostat group.

A further embodiment of the invention is shown in FIGS. 9A and 9B, illustrating a heliostat grouping 53 with poles 9 that are substantially similar in length. In this embodiment, variation in mirror height is provided by footings 41 and 43. As shown in the figure, footings 41 proximal to the target have a first, lower height, while footings 43 distal to the target have a second, higher, height. Embodiments using this approach may use any number of footings of varying heights; they may choose to provide footings under every pole 9, or they may choose to provide fewer footings. One skilled in the art will appreciate that a minimum of three footings is often desirable. In some embodiments, the footing is included as part of the frame 7, while in other cases, it may be separate; for example, the footings could be concrete piers that are poured on-site, or they could be precast elements such as cinder blocks.

Further embodiments of the invention provide a combination of varying footing heights and varying pole lengths.

Figure 10B:
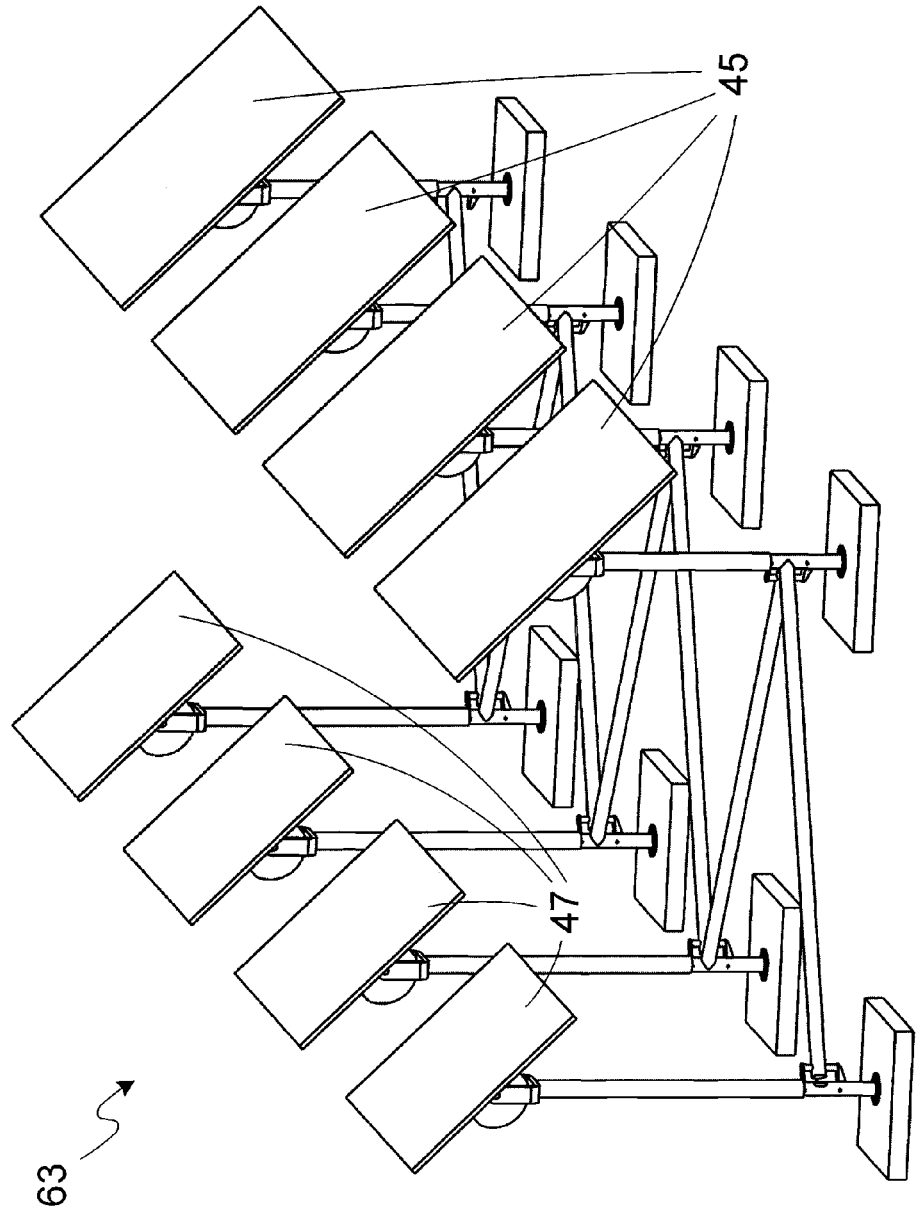
FIG. 10B is a perspective view of a heliostat group with elevated mirrors that are smaller.

One skilled in the art will appreciate that mirrors at the greatest heights, especially the highest mirrors in the most remote or distant positions of a given heliostat group, will tend to experience the greatest wind forces. To help mitigate this effect, the present invention includes embodiments that provide smaller mirrors for use at the greater heights, helping to reduce the wind forces on these more exposed mirrors. One such embodiment is illustrated in FIGS. 10A and 10B. In the figure, a heliostat grouping 63 includes proximal mirrors 45 having a first, larger area, with distal mirrors 47 having a second, smaller area. In some embodiments, each successive tier has mirrors of successively smaller area, while in other embodiments, only some tiers have mirrors of smaller area. In further embodiments, mirrors within a tier can have different areas if desired, for example to achieve some desirable shadowing property in addition to certain wind properties.

Extending this concept further, the present invention appreciates that mirrors at the perimeter of a heliostat field may tend to be exposed to greater wind forces than mirrors closer to the center of the heliostat field, and therefore teaches that some preferred embodiments include heliostat groups more distal to the target that include mirrors smaller than heliostat groups more proximal to the target; for heliostat groups of similar geometry, the comparison of the areas of corresponding mirrors (i.e. those in the same relative position with each group) is of particular interest. In some embodiments, only mirrors with greater heights are smaller in the distal heliostat groups than their corresponding mirrors in more proximal groups, while in other embodiments, other mirrors or all the mirrors are smaller in the distal heliostat groups. While the mirrors shown so far have all been rectangular, the present invention teaches that, when used with a tip-tilt tracking architecture (taught by applicants' co-pending U.S. patent application Ser. No. 13/418, 947), another useful mirror shape for heliostat groups is a rounded rectangle. FIG. 11 shows a heliostat group 73 with rounded rectangle mirrors, including rounded rectangle mirror 49.

One skilled in the art will appreciate that, in some solar power systems, especially when land area is limited, it is desirable to provide the maximum possible mirror area in a minimum space. When used with a tip-tilt tracking architecture in a heliostat grouping with uniformly distributed staggered mirrors, a rounded rectangle mirror provides the maximum possible collecting area without collisions. This is illustrated in FIGS. 12A, 12B, and 12C.

Figure 12A:
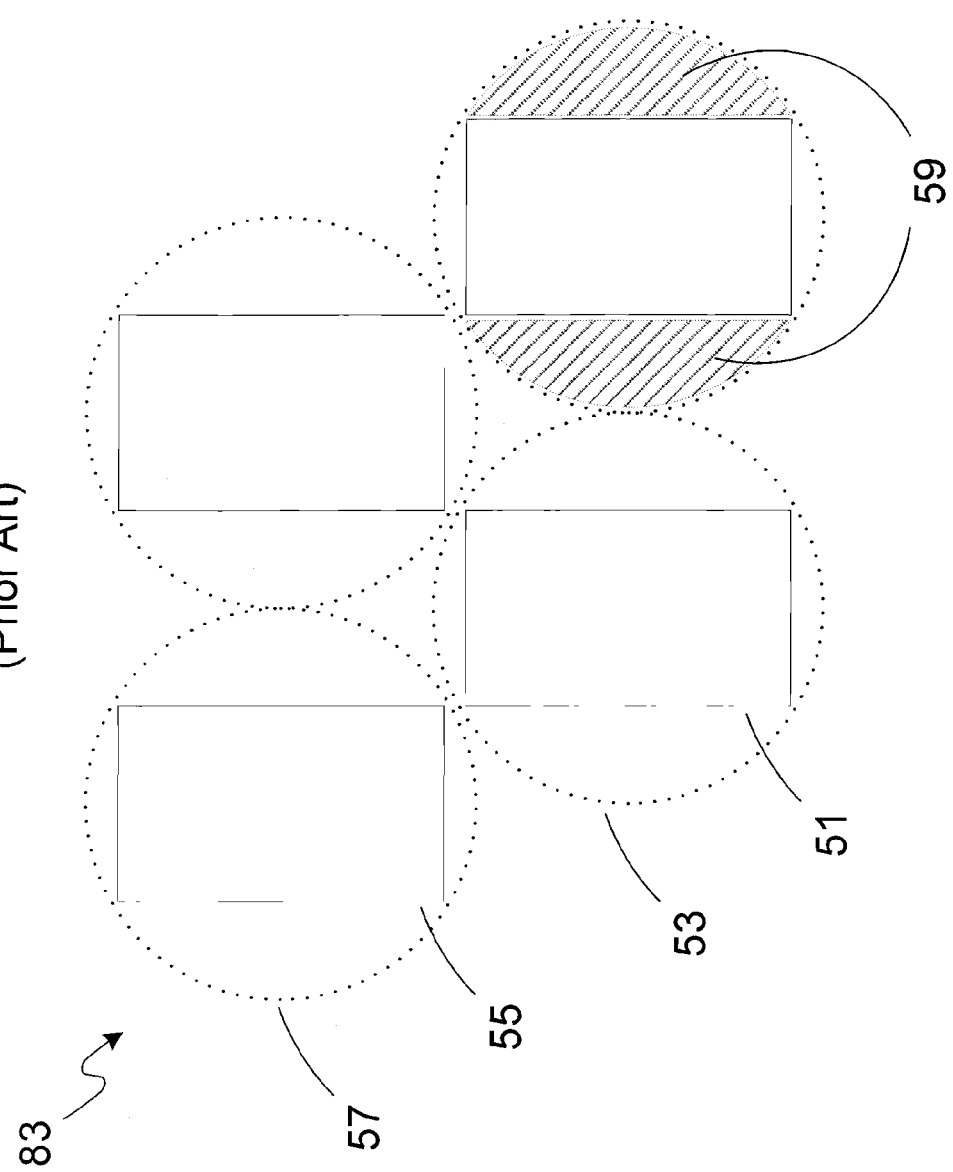
FIG. 12A is a top view of the swept area of a prior art altitude-azimuth heliostat.

FIG. 12A is a top view of a typical prior-art heliostat system 83, using altitude-azimuth tracking. The figure illustrates four heliostat mirrors, including mirror 51 and mirror 55. In this view, the altitude axes of the heliostats have been oriented so that the heliostat mirrors are pointing straight up; this is the worst case for collisions. As the azimuth axis of the heliostat is then rotated, each mirror sweeps out an circular area as shown by the dotted lines, with mirror 51 sweeping out circular area 53, mirror 55 sweeping out circular area 57, and so on. In order to avoid collisions, it is necessary to space the heliostats far enough apart that the swept circular areas do not overlap. One skilled in the art will appreciate that a hexagonal packing pattern provides for the highest packing density.

Figure 12B:
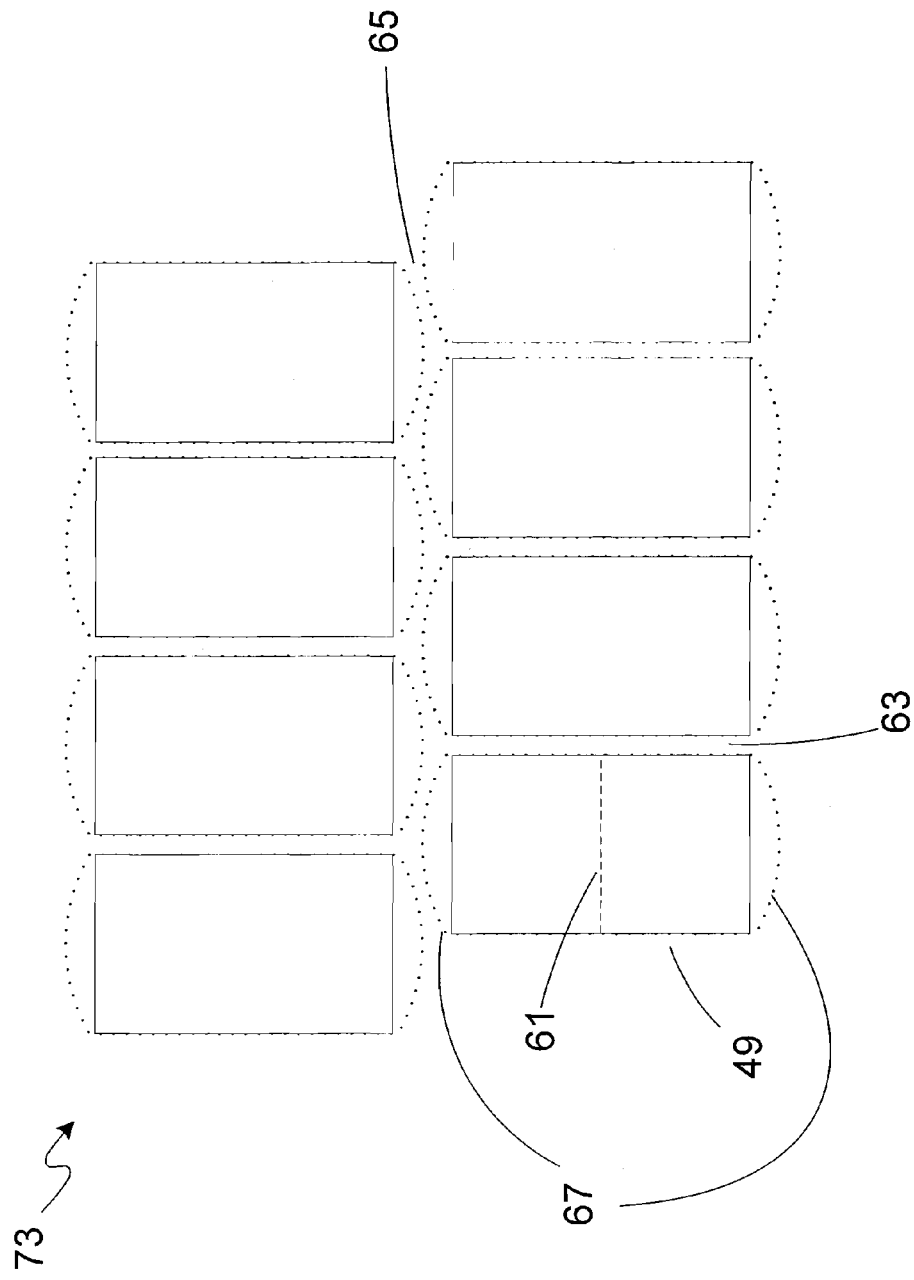
FIG. 12B is a top view of the swept area of a rounded rectangle mirror on a tip-tilt heliostat according to the present invention.

FIG. 12B is a schematic top view of the rounded rectangle heliostat grouping 73 shown in FIG. 11. In a tip-tilt system, the azimuth axis of the prior-art design, which is perpendicular to the ground, has been replaced by a tip axis, which is parallel to the ground. The dotted line 61 illustrates the tip axis of mirror 49. Since this axis is parallel to the ground, the mirror does not spin about its center when viewed from the top, thus permitting the mirrors to be placed directly next to one another, with only a minimal gap 63 required for clearance, even as small a gap as 1 millimeter. However, in the other axis, a gap 65 is required to prevent collisions.

Figure 12C:
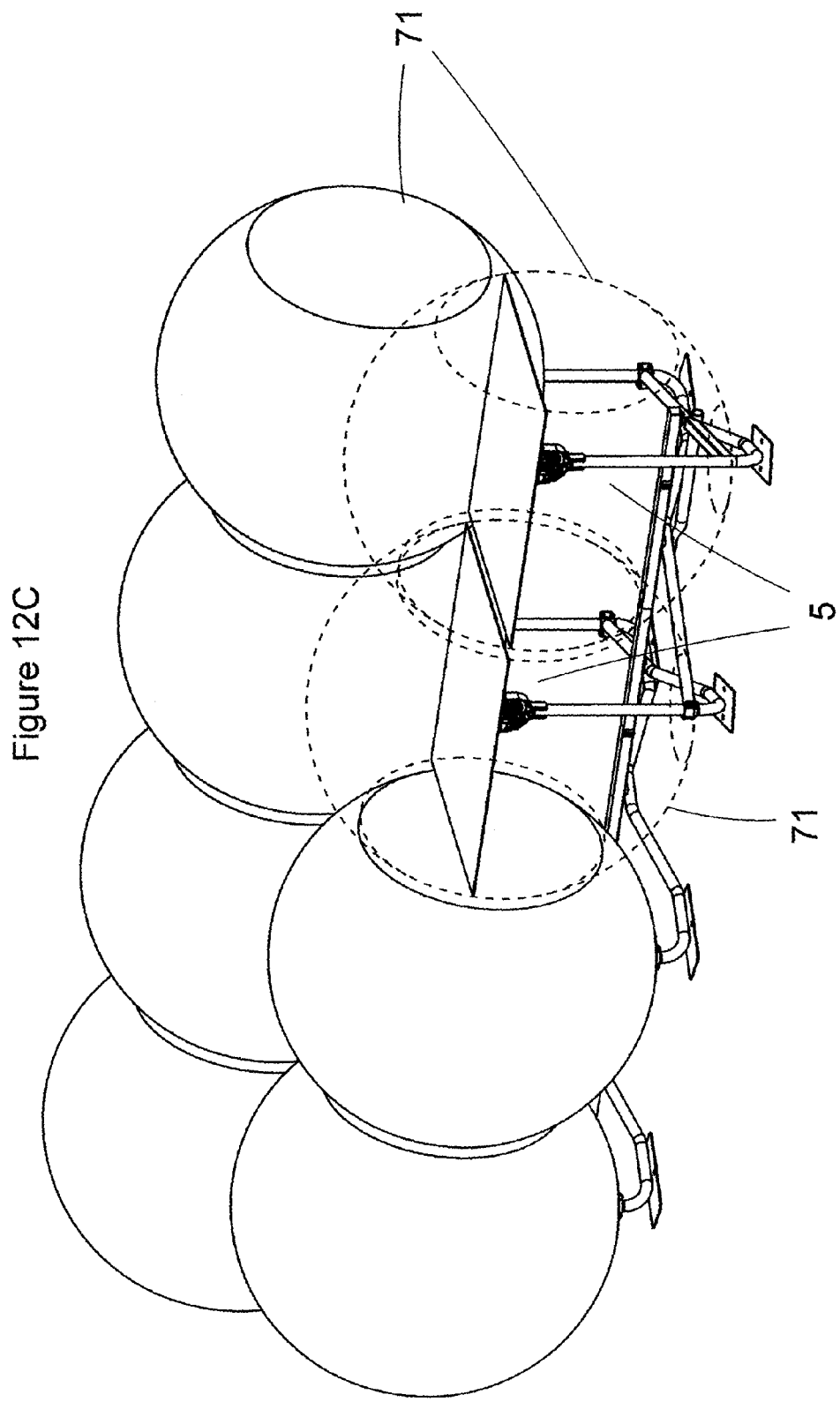
FIG. 12C is a perspective view of the swept volume of a rectangular mirror in a tip-tilt heliostat group.

FIG. 12C illustrates that the volume swept by a tip-tilt rectangular heliostat mirror is a truncated sphere 71. In the figure, two heliostat mirror is shown for reference, while the other six mirrors have been enclosed inside a shape that approximates a truncated sphere, representing the swept volume of the mirror as it articulates over its range of motion.

In top view, the projection 67 of this truncated sphere is a rounded rectangle, as shown in FIG. 12B. This advantageously permits the mirrors to be packed more closely together than in an altitude-azimuth system. In particular, referring again to FIG. 12A, the side lobes 59 of the sphere swept by the prior art heliostat mirror are eliminated, so this space between the mirrors can be eliminated.

Further consideration of the kinematics of the tip-tilt tracker reveals that a rounded rectangle mirror with a shape matching the top view projection 67 of truncated sphere 71 has exactly the same swept volume as the rectangular mirror. Thus, rather than being restricted to rectangular mirrors, a full rounded rectangle mirror 49 can be used without collisions, as shown in FIG. 11.

Figure 13:
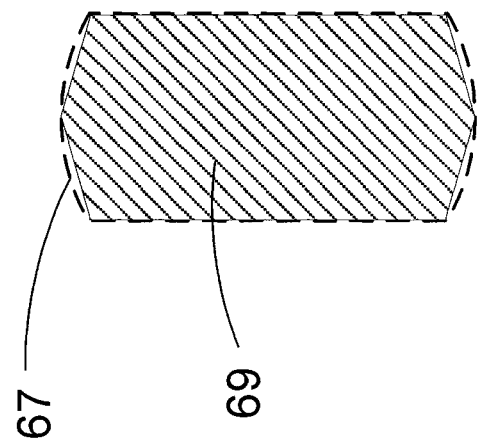
FIG. 13 is diagram of a representative hexagonal heliostat mirror inscribed within a rounded rectangle.

The present invention teaches that there is a continuum of shapes possible. In one embodiment, shown in FIG. 13, the mirror shape can be the inscribed hexagon 69 of the rounded rectangle 67; such a shape may be easier to manufacture.

Any shape that can be inscribed within the rounded rectangle 67 is possible, including diamonds, octagons, or any convenient shape.

The area density of the rounded rectangle shape is attributable to its round end caps, which fill in area not filled in by a rectangular mirror. Further comparison of the difference in area between rectangular and rounded rectangle mirrors reveals that the area difference is greatest with mirrors that are short and wide, while it may be insignificant for mirrors that are tall and thin. For example, FIG. 14 illustrates a rectangular mirror 75 with a 3:1 aspect ratio. A rounded rectangle mirror that fits in to the same swept volume would add the area of end caps 77 to the mirror. For this high aspect ratio, the benefit of adding the end caps is not significant, while the cost of the rectangular mirror is likely lower than the rounded rectangle.

In recognition of this fact, the present invention teaches that rectangular mirrors with high ratios of height to width, such as 1.5:1 or greater, are preferred mirrors in many tip-tilt heliostat system embodiments. To be more specific, by "height", we mean the mirror dimension that is parallel to the heliostat's tilt axis, as defined in applicants' co-pending application "Tracking Modules Including Tip/Tilt Adjustability and Construction Features", U.S. patent application Ser. No. 13/418,947, incorporated herein by reference in its entirety, while by "width" we mean the mirror dimension that is parallel to the heliostat's tip axis, which is the drive axis that is substantially horizontal.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

What is claimed is:

1. A heliostat group configured to reflect light to a target, the heliostat group comprising:
   a) a support frame;
   b) a plurality of heliostat support masts of different lengths on the support frame;
   c) a plurality of mirrors, each mirror supported by the plurality of heliostat support masts of different lengths, the plurality of mirrors at different heights comprising at least one mirror at a first height and at least one mirror at a second height, wherein the second height is greater than the first height, and wherein the at least one mirror at the first height is closer to the target than the at least one mirror at the second height;
   d) at least two tip/tilt drive mechanisms configured to orient at least two mirrors; and
   e) a lateral gap between adjacent mirrors so as to allow clearance between the adjacent mirrors.

2. The heliostat group according to claim 1, wherein mirror height of the plurality of mirrors increases substantially linearly with distance from the target, for said heliostat group.

3. The heliostat group according to claim 1, wherein each individual mirror of the plurality of mirrors has an area in a range greater than or equal to 0.25 square meters and less than or equal to 3.0 square meters.

4. The heliostat group according to claim 1, wherein at least one of the plurality of mirrors comprises multiple facets.

5. The heliostat group according to claim 1, wherein at least one of the plurality of mirrors is curved.

6. The heliostat group according to claim 1, wherein the mirrors are arranged into at least two tiers, with one or more tiers proximal to the target have lower heights and one or more tiers distal to the target having higher heights.

7. The heliostat group according to claim 1, wherein one or more of the at least one mirror at the second height is smaller than one or more of the at least one mirror at the first height.

8. The heliostat group according to claim 1, wherein at least one of the plurality of mirrors has a substantially rounded rectangle shape.

9. The heliostat group according to claim 1, wherein at least one of the plurality of mirrors substantially inscribes a rounded rectangle area.

10. The heliostat group according to claim 9, wherein the at least one mirror that substantially inscribes a rounded rectangle area has a substantially hexagonal shaped.

11. The heliostat group according to claim 9, wherein the at least one mirror that substantially inscribes a rounded rectangle area is substantially diamond shaped.

12. The heliostat group of claim 1, wherein the lateral gap is as small as one millimeter.

13. The heliostat group according to claim 1, further comprising:
   a) at least two substantially rectangular mirrors with a height-to-width ratio of at least 1.5 to 1.0; and
   b) at least two tip/tilt drive mechanisms configured to orient said substantially rectangular mirrors.

* * * * *